United States Patent
Kumar et al.

(10) Patent No.: US 10,846,824 B2
(45) Date of Patent: Nov. 24, 2020

(54) SYSTEMS AND METHODS FOR RECONSTRUCTING SUPER-RESOLUTION IMAGES UNDER TOTAL ALIASING BASED UPON TRANSLATION VALUES

(71) Applicant: Tata Consultancy Services Limited, Mumbai (IN)

(72) Inventors: Achanna Anil Kumar, Bangalore (IN); Narendra N, Bangalore (IN); Girish M. Chandra, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 126 days.

(21) Appl. No.: 16/213,435

(22) Filed: Dec. 7, 2018

(65) Prior Publication Data
US 2019/0180414 A1  Jun. 13, 2019

(30) Foreign Application Priority Data
Dec. 8, 2017  (IN) .............................. 201721044207

(51) Int. Cl.
 *G06K 9/32*  (2006.01)
 *G06T 3/40*  (2006.01)
 (Continued)

(52) U.S. Cl.
 CPC ............ *G06T 3/4053* (2013.01); *G06T 5/002* (2013.01); *G06T 5/10* (2013.01)

(58) Field of Classification Search
 CPC .......... G06T 3/4053; G06T 5/002; G06T 5/10
 (Continued)

(56) References Cited

U.S. PATENT DOCUMENTS 6,445,830 B1 * 9/2002 Gilling .................... G06T 5/10
                                                              382/128
7,349,583 B2   3/2008 Kumar et al.
(Continued)

OTHER PUBLICATIONS

Lim, C.W. (2015). *Compressive Sampling of Communication Sampling* (Doctoral dissertation). Retrieved from https://mountainscholar.org/bitstream/handle/11124/20182/Lim_mines_0052E_10826.pdf?sequence=1.

(Continued)

*Primary Examiner* — Marceau Milord
(74) *Attorney, Agent, or Firm* — Finnegan, Henderson, Farabow, Garrett & Dunner, LLP

(57) ABSTRACT

Systems and methods for reconstructing super-resolution images under total aliasing based upon translation values. Traditional systems and methods provide for extracting super-resolution (SR) image/s from low-resolution (LR) image/s but include aliasing as a background noise which degrades the performance or include aliasing into an image model which leads to an enormously high computational complexity. Embodiments of the present disclosure provide for reconstructing super-resolution images based upon translation values by taking aliasing in consideration by capturing a set of LR images, estimating, using a Fast Fourier Transformation, a set of translation values based upon the set of LR images, obtaining, using a multi-signal classification technique, one or more optimized frequency spectrums based upon the set of translation values and reconstructing one or more SR images based upon the set of translation values.

6 Claims, 5 Drawing Sheets

(51) Int. Cl.
*G06T 5/10* (2006.01)
*G06T 5/00* (2006.01)

(58) Field of Classification Search
USPC .............................. 382/299, 159, 266, 284
See application file for complete search history.

(56) References Cited

U.S. PATENT DOCUMENTS

| | | | | |
|---|---|---|---|---|
| 7,428,019 | B2* | 9/2008 | Irani | G06T 3/4069 |
| | | | | 348/208.13 |
| 7,768,524 | B2* | 8/2010 | Snyder | G06T 15/80 |
| | | | | 345/545 |
| 7,853,098 | B2* | 12/2010 | Hardy | G06T 7/32 |
| | | | | 382/294 |
| 8,223,831 | B2* | 7/2012 | Lertrattanapanich | H04N 5/145 |
| | | | | 375/240 |
| 8,260,086 | B2 | 9/2012 | Riley et al. | |
| 8,279,341 | B1* | 10/2012 | Bozinovic | H04N 19/51 |
| | | | | 348/452 |
| 8,285,079 | B2* | 10/2012 | Robertson | G06T 7/248 |
| | | | | 382/294 |
| 8,577,184 | B2 | 11/2013 | Young | |
| 8,761,506 | B1* | 6/2014 | Padwick | G06K 9/0063 |
| | | | | 382/167 |
| 8,842,735 | B2* | 9/2014 | Robertson | H04N 19/63 |
| | | | | 375/240.16 |
| 8,878,950 | B2* | 11/2014 | Lelescu | G06T 3/4076 |
| | | | | 348/218.1 |
| 9,218,641 | B1* | 12/2015 | Ellis | G06T 3/4007 |
| 9,269,014 | B2* | 2/2016 | Comstock, II | G06K 9/46 |
| 9,955,071 | B2* | 4/2018 | Deever | G06T 3/4076 |
| 2007/0019887 | A1* | 1/2007 | Nestares | G06T 3/4053 |
| | | | | 382/299 |
| 2010/0156415 | A1* | 6/2010 | Keupp | G01R 33/485 |
| | | | | 324/309 |
| 2010/0183071 | A1 | 7/2010 | Segall et al. | |
| 2011/0064327 | A1* | 3/2011 | Dagher | G06T 5/004 |
| | | | | 382/263 |
| 2011/0142366 | A1* | 6/2011 | Young | G06T 3/4069 |
| | | | | 382/274 |
| 2015/0297193 | A1* | 10/2015 | Rothberg | A61B 8/56 |
| | | | | 600/459 |
| 2015/0334315 | A1* | 11/2015 | Teich | H04N 5/2257 |
| | | | | 348/164 |
| 2016/0028966 | A1* | 1/2016 | Sheikh | G06T 3/0006 |
| | | | | 348/240.2 |
| 2016/0066775 | A1 | 3/2016 | Hunter et al. | |
| 2017/0191945 | A1* | 7/2017 | Zhang | G06T 7/0006 |
| 2019/0206070 | A1* | 7/2019 | Nash | G06T 7/37 |

OTHER PUBLICATIONS

Grigoryan, R. (2014). *Acquisition of Multi-Band Signals via Compressed Sensing* (Doctoral dissertation). Retrieved from https://core.ac.uk/download/pdf/60619775.pdf.

* cited by examiner

SYSTEMS AND METHODS FOR RECONSTRUCTING SUPER-RESOLUTION IMAGES UNDER TOTAL ALIASING BASED UPON TRANSLATION VALUES

PRIORITY CLAIM

This U.S. patent application claims priority under 35 U.S.C. § 119 to: India Application No. 201721044207, filed on Dec. 8, 2017. The entire contents of the aforementioned application are incorporated herein by reference.

TECHNICAL FIELD

The present disclosure generally relates to reconstructing super-resolution images under total aliasing based upon translation values. More particularly, the present disclosure relates to systems and methods for reconstructing super-resolution images under total aliasing based upon translation values.

BACKGROUND

A super-resolution image finds applications in many areas such as in satellite and aerial imaging, medical imaging etc. and there are many techniques available for obtaining super-resolution images. There has been an increasing trend of removing the front end anti-aliasing filter in cameras to increase the image sharpness. Removal of this filter causes total aliasing of a low-resolution image spectrum.

Aliasing, is a well-known phenomenon caused due to sampling of signals below the Nyquist sampling rate and is usually considered as nuisance. However, aliased signals contains information about high frequency components and reconstructing the signal by resolving these high frequency components from multiple, slightly different aliased signals (also referred as low resolution (LR) signal) has many applications. One such key application being the image super-resolution (SR). Aliasing may lead to loss of detailed information or high frequency components from the images. An image or signal processing method, called super-resolution image reconstruction, can increase image resolution without changing the design of the optics and the detectors. In other words, super-resolution image reconstruction can produce high-resolution images by using the existing low-cost imaging devices from a sequence (or a few snapshots) of low resolution images. The emphasis of the super-resolution image reconstruction algorithm is to de-alias the under sampled images to obtain an alias-free or, as identified in the literature, a super-resolved image.

When the entire band is affected, the traditional systems and methods include aliasing as a background noise which may degrade the performance. Alternatively, if aliasing is included into an image model, the computational complexity becomes enormously high. For example, even for a nominal LR dimension of size 10×10 and the SR dimension of size 100×100, the order of the matrix to be handled may be in the range of 100×10000 which may be enormously high. Furthermore, due to the iterative nature of the algorithm, these large dimensional matrices must be handled at each iteration. Super-resolution image reconstruction generally increases image resolution without necessitating a change in the design of the optics and/or detectors by using a sequence (or a few snapshots) of low-resolution images. Super-resolution image reconstruction algorithms effectively de-alias under sampled images to obtain a substantially alias-free or, as identified in the literature, a super-resolved image. Thus, a SR image is not just merely an up-sampled and interpolated image, but it also contains additional details due to the incorporation of high frequency information.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

Systems and methods of the present disclosure enable reconstructing super-resolution images under total aliasing based upon translation values. In an embodiment of the present disclosure, there is provided a method for reconstructing super-resolution images based upon translation values, the method comprising: capturing, using an image capturing device, a set of low-resolution images comprising of one or more aliased images; estimating, using a Fast Fourier transformation, the set of translation values from the set of low-resolution images for obtaining one or more optimized frequency spectrums to reconstruct one or more super-resolution images, wherein the set of translation values comprise translational shifts of the set of low-resolution images; obtaining, using a multiple signal classification (MUSIC) technique, the one or more optimized frequency spectrums from the set of translation values for extracting the one or more super-resolution images; reconstructing, using an Inverse Fourier transformation, the one or more super-resolution images from the one or more optimized frequency spectrums; determining, using a normalized cross power spectrum technique, a set of initial translational values based upon one or more low-resolution images and enhancement factors for updating a second set of translational values; updating the second set of translational values based upon the set of initial translational values and one or more gradient values to extract the one or more super-resolution images; and updating the second set of translational values by identifying the one or more gradient values for updating one or more integer values closest to the set of translational values to extract the one or more super-resolution images.

In an embodiment of the present disclosure, there is provided a system for reconstructing super-resolution images under total aliasing based upon translation values, the system comprising one or more processors; one or more data storage devices operatively coupled to the one or more processors and configured to store instructions configured for execution by the one or more processors to: capture, using an image capturing device, a set of low-resolution images comprising of one or more aliased images; estimate, using a Fast Fourier transformation, a set of translation values from the set of low-resolution images for obtaining one or more optimized frequency spectrums to reconstruct one or more super-resolution images, wherein the set of translation values comprise translational shifts of the set of low-resolution images; obtain, using a multiple signal classification (MUSIC) technique, the one or more optimized frequency spectrums from the set of translation values for extracting the one or more super-resolution images; reconstruct, using an Inverse Fourier transformation, the one or more super-resolution images from the one or more optimized frequency spectrums; determine, using a normalized cross power spectrum technique, a set of initial translational values based upon one or more low-resolution images and enhancement factors for updating a second set of translational values; update the second set of translational values based upon the set of initial translational values and one or more gradient values to extract the one or more super-resolution images; and update the second set of translational values by identifying the one or more gradient values for updating one or more integer values closest to the set of translational values to extract the one or more super-resolution images.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

DETAILED DESCRIPTION

Figure 1:
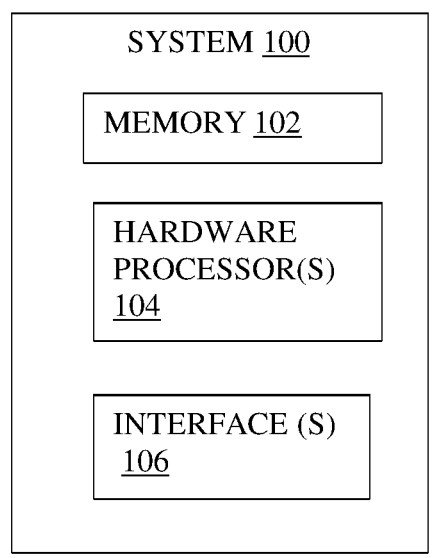
FIG. 1 illustrates a block diagram of a system for reconstructing super-resolution images under total aliasing based upon translation values according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments of the present disclosure provide systems and methods for reconstructing super-resolution images under total aliasing based upon translation values. Super-resolution enhances the resolution of an image. Super-resolution images may be generated from one or more than one low resolution image(s). Super-resolution image reconstruction can increase image resolution without changing the design of the optics and the detectors. In other words, super-resolution image reconstruction can produce high-resolution images by using the existing low-cost imaging devices from a sequence (or a few snapshots) of low resolution images. The emphasis of the super-resolution image reconstruction algorithm is to de-alias the under sampled images to obtain an alias-free or, as identified in the literature, a super-resolved image.

The traditional systems and methods consider aliasing into the image model for reconstructing super-resolution image/s when the entire band is affected. The technique may work under total aliasing but the computational complexity may be enormously high. For example, the dimensions of the matrix to be handled may be very large even for a nominal LR and SR image sizes. Super-resolution image reconstruction comprises improving image resolution without necessitating a change in the design of the optics and/or detectors by using a sequence (or a few snapshots) of low-resolution image/s. Super-resolution image reconstruction algorithms effectively de-alias under sampled images to obtain a substantially alias-free or, as identified in the literature, a super-resolved image. Thus, a SR image is not just merely an up-sampled and interpolated image, but it also contains additional details due to the incorporation of high frequency information.

The traditional systems and methods consider aliasing as a background noise and hence the super-resolution image reconstruction performance is quiet low in case of total aliasing. Hence, there is a need for technology that may consider the problem of super-resolution (SR) image reconstruction from a set of totally aliased low resolution (LR) images with different unknown sub-pixel offsets.

The technology must provide for the joint estimation of the unknown shifts and SR image spectrum as a dictionary learning problem and alternating minimization approach to resolve the problem of joint estimation. The technology must also provide for smaller matrices size to be handled during the computation, typically based upon number of images and enhancement factors, and is completely independent on the actual dimensions of the LR and SR images hence requiring significantly lesser resources than the traditional systems and methods.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for reconstructing super-resolution images under total aliasing based upon translation values in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
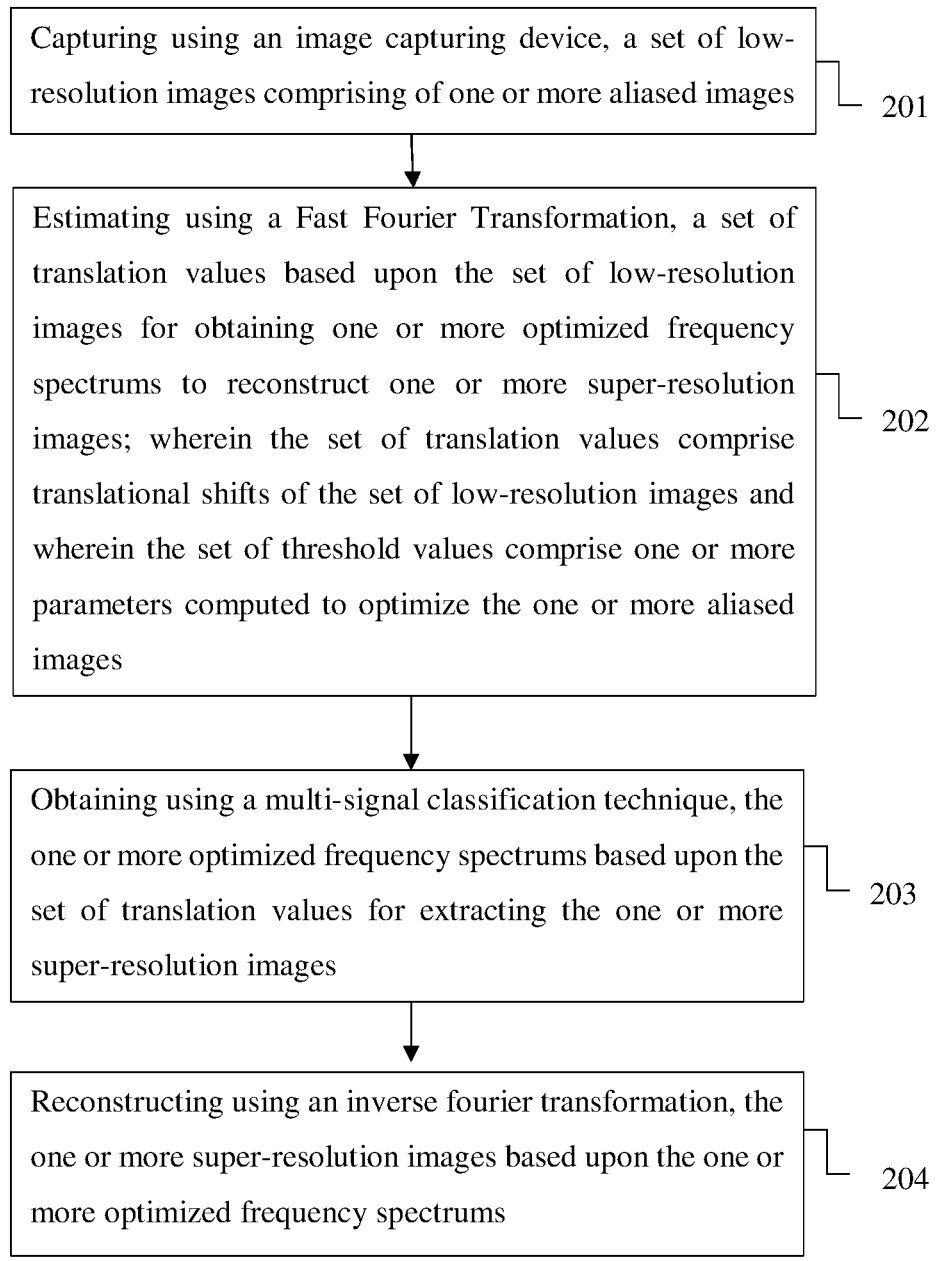
FIG. 2 is a flowchart illustrating the steps involved for reconstructing super-resolution images under total aliasing based upon translation values according to an embodiment of the present disclosure.

FIG. 2, with reference to FIG. 1, illustrates an exemplary flow diagram of a method for reconstructing super-resolution images under total aliasing based upon translation values in accordance with an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

Figure 3A:
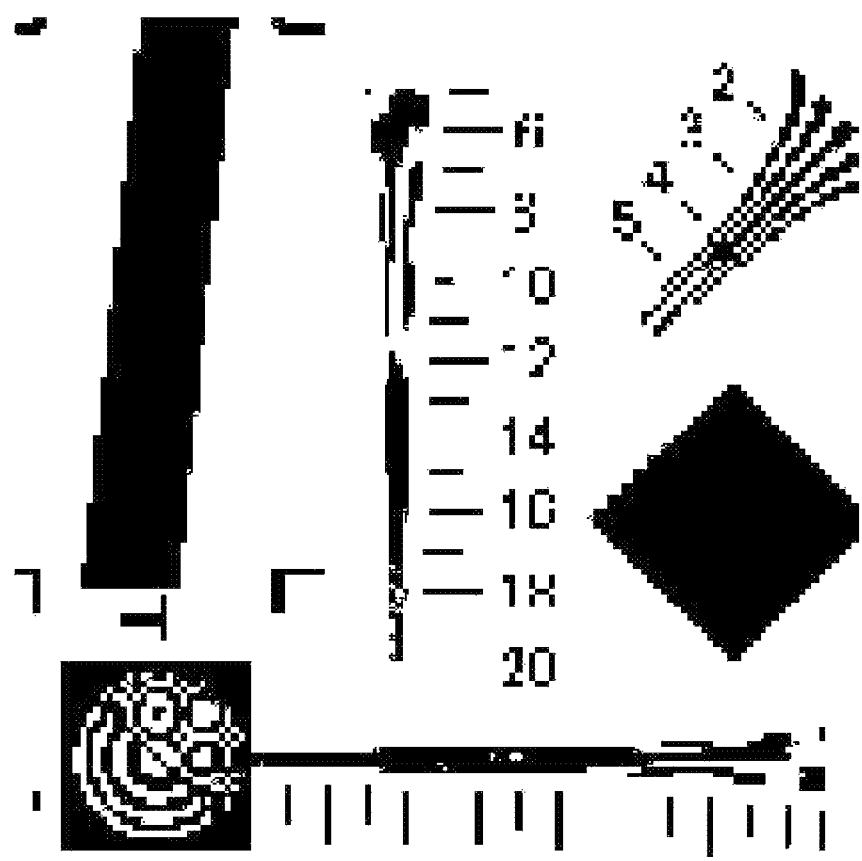
FIG. 3(a) illustrates visual representation of a low-resolution image captured using an image capturing device according to an embodiment of the present disclosure.

According to an embodiment of the present disclosure, at step 201, a set of low-resolution images comprising of one or more aliased images may be captured using an image capturing device. The image capturing device may comprise of (but not limited to) a camera array to capture the set of low-resolution images comprising of different unknown multi-pixel offsets. In an embodiment, not only the set of low-resolution images (to be captured) are aliased but further, due to the absence of anti-aliasing filter, the entire spectrum of the set of low-resolution images are totally aliased. According to an embodiment of the present disclosure, the $k^{th}$ ($1 \leq k \leq K$), LR image $g_k(n)$ of size $N_x \times N_y$ may be modelled as:

$$g_k(n) = h(L_n + c_k) + \eta(n) \qquad \text{equation (1)}$$

where $h(t)$, $t \in \mathbb{R}^2$ denotes the 2-D image scene, $\{n=[n_x, n_y]^T | n \in \mathbb{Z}^2, 0 \leq n_x \leq N_x-1, 0 \leq n_y \leq N_y-1\}$, $c_k = [c_{xk}, c_{yk}]^T$, $$L = \begin{pmatrix} L_x & 0 \\ 0 & L_y \end{pmatrix}, L_x, L_y$$

denotes the enhancement factors along x-axis and y-axis respectively (where the factors $L_x$, $L_y$ are also referred to as decimation factors), $c_{xk}$, $c_{yk}$ which reside in the range of $0 < c_{xk} < L_x$, $0 < c_{yk} < L_y$ denote the relative translation shifts of the $k^{th}$ LR image along x-axis and y-axis respectively and $\eta(n)$ denote the additive white-noise. In an embodiment, it may be assumed that the first LR image is the reference image and hence $c_{xk} = c_{yk} = 0$ for $k=1$. In an embodiment, it may be further assumed that the translation shifts are distinct and reside in the sub-pixel range with respect to the LR image, that is, $c_{\theta k}/L_\theta < 1$, for $\theta \in \{x, y\}$. In an embodiment, it may be further assumed that the enhancement factors may exceed the set of LR images, that is, $K < L_x L_y$. Referring to FIG. 3(a), the LR image (blurred due to aliasing and other factors) captured (on the basis of equation (1) and assumptions above) using the image capturing device may be referred.

According to an embodiment of the present disclosure, at step 202, a set of translation values from the set of low-resolution images may be estimated using a Fast Fourier Transformation for obtaining one or more optimized frequency spectrums to reconstruct one or more super-resolution images, wherein the set of translation values comprise translational shifts of the set of low-resolution images. In an embodiment, the term translation values are alternatively referred to as translational values and may be used interchangeably. By computing the set of translational values, a linear compact representation between LR image spectrums and SR image spectrum can be provided. For reconstructing the one or more super-resolution images, that is the SR image $h(m)$, $\{m=[m_x, m_y]^T | 0 < m_x < L_x n_x, 0 < m_y < L_y n_y\}$ from the captured K known LR images $g_k(n)$ having the unknown translational shifts $c_k$. In an embodiment of the present disclosure, as discussed above, it may be noted that from equation (1) not only the set of low-resolution images are aliased but further, due to the absence of anti-aliasing filter, the entire spectrum of the set of low-resolution images are totally affected by aliasing. The process of estimating the set of translational values may now be considered in detail. According to an embodiment of the present disclosure, the translational shifts which reside in the range of $0 < c_{\theta k} < L_\theta$ may be expressed as $c_{\theta k} = \text{round}(c_{\theta k}) + \Delta_{c_{\theta k}}$. In an embodiment, $\Delta_{c_{\theta k}}$ may be neglected and an approximation is made that $c_{\theta k} \approx \text{round}(c_{\theta k})$, that is, the translational shifts may be rounded off to closest integer, the set of LR images may be obtained via a multi-coset sampling technique of one or more constructed SR image and may be easily represented as:

$$G(f) = \frac{1}{L_x L_y} \underbrace{\Delta(f) A}_{A_\Delta(f)} s(f) \qquad \text{equation (2)}$$

where $G(f) \triangleq [G_1(f), G_2(f) \ldots G_k(f)]$ for any $1 \leq k \leq K$, $G_k(f)$ may denote the 2-D Fourier Transformation of the $k^{th}$ LR image and $f \in [0,1]^2$. The $k^{th}$ row, $q^{th}$ column element of matrix A which is of size $K \times L_x L_y$ may be expressed as:

$$[A]_{k,q} = e^{j2\pi c_k^T L^{-1} \lambda_q} \qquad \text{equation (3)}$$

where $\lambda_q$ denotes the $q^{th}$ vector of the set $\Lambda \triangleq \{0, 1 \ldots L_x-1\} \times \{0, 1 \ldots L_y-1\}$ (where × denotes Cartesian product). In an embodiment $\Delta(f)$ is a diagonal matrix with diagonal elements $\{e^{-j2\pi c_1^T f}, e^{-j2\pi c_2^T f}, \ldots e^{-j2\pi c_k^T f}\}$ and $s(f) \triangleq [H(f+L^{-1}\lambda_1), H(f+L^{-1}\lambda_2), \ldots, H(f+L^{-1}\lambda_Q)]^T$ where $Q=|\Lambda|=L_x L_y$. $H(f+L^{-1}\lambda_k)$ for $f \in [0,1]^2$ for $f \in [0,1]^2$ represents a sub-band of $H(f)$ of dimension $N_x \times N_y$ beginning from the position $$\begin{pmatrix} N_x & 0 \\ 0 & N_y \end{pmatrix} \lambda_k,$$

where $H(f)$ denotes 2-D Fourier Transform of the SR image $h(m)$ and is of size $N_x L_x \times N_y L_y$.[1] Thus, in an embodiment, LR image spectrum $G_k(f)$ may be observed as a weighted superposition of the sub-bands obtained from rows of $s(f)$, with weights being a function of the translation shifts. According to an embodiment, the property of translation weights may be used to obtain the SR image by overcoming aliasing. In an embodiment, the dimension of A is $K \times L_x L_y$ (that is, the number of LR images×number of sub-bands) and unlike the traditional systems and methods, the size of the matrix is independent of the LR and SR images. Further, in contrast to the traditional system and methods, where the translational shifts are known, in an embodiments of the present disclosure, the set of translational shifts are unknown and to be computed. Thus, in an embodiment, both s(f) and shifts $\{c_k\}_{k=1}^{K}$ are unknown. Thus, both the matrix $A_\Delta(f)$ and s(f) are to be estimated.

According to an embodiment of the present disclosure, using a registration technique, both the matrix $A_\Delta(f)$ and s(f) may be estimated such that below function may be minimized:

$$\sum_f \min_{\hat{A}_\Delta(f),\hat{s}(f)} \left\| G(f) - \frac{1}{L_x L_y} \hat{A}_\Delta(f)\hat{s}(f) \right\|^2 \quad \text{equation (4)}$$

In an embodiment, since K×$L_x L_y$ (as discussed above), hence equation (2) becomes under-determined system of equations. Thus, inherent frequency domain sparsity of most of the natural images may be used. In other words, for most of the natural images, several sub-bands, that is, rows of s(f) may have insignificant energy and thus may be assumed to be approximately sparse. According to an embodiment, the sparsity may be used in the restoration technique and $A_\Delta(f)$ may be estimated by visualizing $A_\Delta(f)$ as a dictionary learning problem. In an embodiment, further alternating minimization technique may then be used to jointly estimate the dictionary or the matrix $\hat{A}_\Delta(f)$ and sparse $\hat{s}(f)$ as discussed below.

According to an embodiment of the present disclosure, the method of estimating or updating the dictionary or the matrix $A_\Delta(f)$ may now be considered in detail. In an embodiment, unlike the traditional systems and methods, the set of translational values $\{c_k\}_{k=1}^{K}$ may be updated iteratively. At the beginning of the iteration, the translational shifts obtained using a normalized cross power spectrum (NCPS) technique may be initialized to obtain a set of initial translational values and further, by considering only lower frequencies, the effect of aliasing may be minimized. The steepest descent technique may then be used for updating the parameters $\{c_k\}_{k=1}^{K}$. In an embodiment, the mean squared error (MSE) at the end of the $i^{th}$ steepest descent iteration may be expressed as:

$$F(A_\Delta^{(i)}) = \frac{1}{N_x N_y} \sum_f \left\| G(f) - \frac{1}{L_x L_y} \hat{A}_\Delta^{(i)}(f)\hat{s}^{(t-1)}(f) \right\|_2^2 \quad \text{equation (5)}$$

where $\hat{A}_\Delta^{(i)}(f)$ denotes the estimated dictionary at the end of the $i^{th}$ iteration and $\hat{s}^{(t-1)}(f)$ denotes the estimated signal at the $(t-1)^{th}$ alternating minimization iteration. Using the $F(A_\Delta^{(i)})$, the translational shifts at the $(i+1)^{th}$ iteration may be updated as:

$$c_{\theta k}^{(i+1)} \leftarrow c_{\theta k}^{(i)} - \mu \frac{\partial F(A_\Delta^{(i)})}{\partial c_{\theta k}} \quad \text{equation (6)}$$

where 1≤k≤K and μ denotes the step size. However, unlike traditional systems and methods, since the embodiments of the present disclosure comprises a diagonal matrix Δ(f), the dictionary is different for each frequency bin and taken into consideration while computing the gradient (computing of the gradient has been discussed below). For example, referring to table 1 below, if the enhancement factors $L_x \times L_y = 10 \times 10$, the set of initial translational values obtained using the NCPS technique may be referred.

TABLE 1

| | Initialization (with normalized cross power spectrum technique) | Iteration 1 | Iteration 2 | Iteration 3 |
|---|---|---|---|---|
| Low-resolution image 1 | (0, 0) | (0, 0) | (0, 0) | (0, 0) |
| Low-resolution image 2 | (5, 3.1) | (4, 3) | (3, 3) | (2, 3) |
| Low-resolution image 3 | (2, 7) | (3, 6) | (3, 5) | (3, 4) |
| Low-resolution image 4 | (5, 3) | (4, 4) | (4, 5) | (4, 5) |

According to an embodiments of the present disclosure, with fixed $\hat{s}^{(t-1)}(f)$, the iterations may be performed till convergence, that is, till $\|F(A_\Delta^{(i+1)}) - F(A_\Delta^{(i)})\|^2 < \in_s$. Finally, the updated dictionary $\hat{A}_\Delta^{(t)}(f)$ at the $t^{th}$ alternating minimization iteration may be formed by computing the parameters $\{\hat{c}_k^{(t)}\}_{k=1}^{K}$.

According to an embodiment of the present disclosure, at step 203, one or more optimized frequency spectrums from the set of translation values may be obtained using a multiple signal classification (MUSIC) technique. For obtaining the one or more optimized frequency spectrums, the estimation of $\hat{s}^{(t)}(f)$ may now be considered in detail. In an embodiment based upon the sparsity on s(f) and estimate of the dictionary $A_\Delta^{(t)}(f)$, equation (2) may be reduced to a sparse signal estimation. In an embodiment, using below equation, that is, equation (7), the covariance matrix at the $t^{th}$ iteration may be formed.

$$R^{(t)} = \sum_f (\hat{\Delta}^t(f))^H G(f)(G(f))^H \hat{\Delta}^{(t)}(f) \quad \text{equation (7)}$$

Figure 3B:
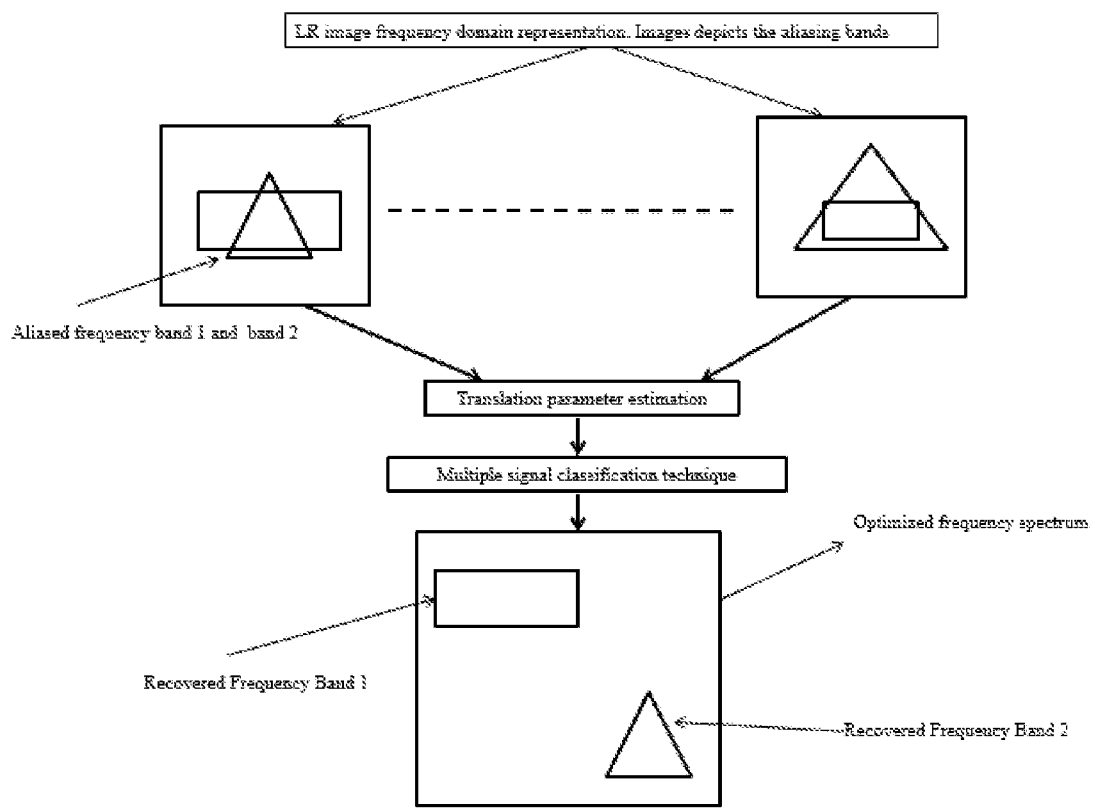
FIG. 3(b) illustrates visual representation of one or more optimized frequency spectrums obtained based upon translation values according to an embodiment of the present disclosure.

Referring to FIG. 3(b), the one or more optimized frequency spectrums obtained from the set of translation values using the MUSIC technique) may be referred.

According to an embodiment of the present disclosure, the entire vector space of dimension K may be further divided into signal space $\Lambda_s$ of dimension $\alpha_s$ that is spanned by singular vectors of $R^{(t)}$ corresponding to $\alpha_s$ significant singular values and the other orthogonal noise subspace $\Lambda_n$ spanned by the remaining K−$\alpha_s$ singular vectors. According to an embodiment, the supports, that is, the columns of $A_\Delta^{(t)}(f)$ corresponding to the most significant $\alpha_s$ rows of $\hat{s}^{(t)}(f)$ at the $t^{th}$ iteration may be estimated (computed). In an embodiment, $\alpha_s$ may also be interpreted as the number of significant aliasing sub-bands. According to an embodiment, based upon $t^{th}$ alternating minimization iteration, where $MSE_g \triangleq 1/(N_x N_y)\sum_f \|\hat{G}^{(t)}(f) - G(f)\|_2^2$, $\hat{G}^{(t)}(f) = 1/(L_x L_y) \hat{A}_\Delta^{(t)}(f)\hat{s}^{(t)}(f)$ may be computed and the entire computation may be repeated or iterated for any threshold value, for example, $0 < \hat{c}_{\theta k} < L_\theta$. In an embodiment, based upon the registration, and the integer approximation (in step 202 above), an estimate of the shifts $\{\hat{c}_k^{(t)}\}_{k=1}^{K}$ may be obtained, which are integers in the range of $0 < \hat{c}_{\theta k} < L_\theta$.

According to an embodiment of the present disclosure, based upon the one or more optimized frequency spectrums and output of the registration step, the one or more SR images may be extracted either from ŝ(f) (by performing a registration technique) as rows of ŝ(f) provides the sub-bands of the SR image (as discussed above). Based upon the arrangement of the ŝ(f), the SR image spectrum may further be obtained and by taking an Inverse Fourier Transformation, the desires SR image may be obtained. In an embodiment, the registration may also be performed by using non-uniform interpolation. Again, based upon the output of the registration step, an estimate of the sub-pixel offsets $\{\hat{c}_{\theta k}/L_\theta\}_{k=1}^K\}$ may be obtained. A non-uniform bi-cubic interpolation technique may be used for placing the one or more LR images at appropriate positions using the sub-pixel offsets on the super-resolution grid of a desired resolution for obtaining the desired SR image.

According to an embodiment of the present disclosure, finally, at step 204, based upon the one or more optimized frequency spectrums, the one or more super-resolution images may be reconstructed. In an embodiment, the one or more super-resolution images may be reconstructed by performing, firstly, an initialization step, where, G(f) may be formed by taking the 2-D Fast Fourier Transformation of the LR images. Further, using the NCPS technique, an initial approximate estimate of the translational shifts $\{c_k^0\}_{k=1}^K$ may be obtained. Secondly, by the alternating minimization technique, the joint estimate of the unknowns $\hat{A}_A(f)$ and ŝ(f) may be obtained. Based upon the ŝ(f) and the sub-pixel offsets $\{c_{\theta k}/L_\theta\}_{k=1}^K\}$ from the registration step, the desired SR image may finally be obtained.

According to an embodiment of the present disclosure, the process of reconstructing the one or more super-resolution images may now be considered in detail. In an embodiment, referring to step 202 and equation (2) again, since an approximation of the translational shifts to the closest integer has been made to hold, hence instead of updating the translational shifts in smaller increments using equation (6), the neighboring integer may be updated depending upon the direction of the gradient to obtain a second set of translational values. In an embodiment, the gradient (also herein referred to as the gradient value) of error with respect of each of the translational values (or the sub-pixel offsets) may be computed along both x-axis and y-axis. The sign of the gradient indicates whether to increment or decrement the translational shifts and magnitude of the gradient indicates contribution of this factor to the error. Using equation (5), the gradient may be obtained as $$\frac{\partial F(A_\Delta^{(i)})}{\partial c_{\theta k}}.$$

The translational shifts may be then updated using below equation:

$$c_{\theta k}^{(i+1)} \leftarrow \begin{cases} c_{\theta k}^{(i)} - \text{sign}\left(\frac{\partial F(A_\theta)}{\partial c_{\theta k}}\right) & 0 < \hat{c}_{\theta k} < L_\theta, \text{ and } \left|\left(\frac{\partial F(A_\theta)}{\partial c_{\theta k}}\right)\right| > \epsilon_h \\ c_{\theta k}^{(i)} \end{cases} \quad \text{equation (8)}$$

where sign($\beta$) = +1 if $\beta \geq 0$, else it is −1.

TABLE 2

| | Initialization (with normalized cross power spectrum technique) | Iteration 1 | Iteration 2 | Iteration 3 |
|---|---|---|---|---|
| Low-resolution image 1 | (0, 0) | (0, 0) | (0, 0) | (0, 0) |
| Low-resolution image 2 | (−5, −0.1) | (−2, −0.1) | (−0.5, −0.1) | (−0.5, −0.1) |
| Low-resolution image 3 | (1, −6) | (0.2, −4) | (0.2, −2) | (0.2, 0.3) |
| Low-resolution image 4 | (−1, 3) | (−0.1, 1.4) | (−0.1, 0.3) | (−0.1, 0.3) |

In an embodiment, referring to table 2, the one or more gradient values computed at each of the iteration may be referred. Referring to tables 1 and 2, if the set of initial translation values are (2,7) and the gradient values of the LR image 3 are (1,−6), iteration may be performed, and after the iteration 1 the set of initial translation values for the LR image 3 may be obtained (using equation (8)) as (3,6). In an embodiment, gradient threshold may be kept as 1 and the set of translational values may further be changed (incremented or decremented) only when the gradient is not less than 1. Thus, referring to table 2 again, at the end of iteration 3, it may be noted that all the gradient values are less than 1, and hence the iterations may be stopped and the second set of translational values thus obtained (when the gradient values are less than 1) may be retained. Thus, taking an example, referring to table 1 again, if the set of translational values of the LR image 3 are (3,4) when the gradient values are less than 1, set of translational values may finally be obtained as (3,4).

In an embodiment, the condition $$\left|\left(\frac{\partial F(A_\theta)}{\partial c_{\theta k}}\right)\right| > \epsilon_h$$

ensures that blind updation (or iteration) is not performed even when the gradient value is insignificant. This further supports faster convergence and more initialization errors may be adjusted. Thus, as discussed above, if the set of translational values of the LR image 3 are (3,4) when the gradient values are less than 1, set of translational values may finally be obtained as (3,4). In an embodiment, after updating the second set of translational values, the sparse spectrum may be computed again using the MUSIC technique for determining the gradient of error. If the gradient of error falls below error threshold, the iterations may be performed again to obtain the second set of translational values, else the iterations may be stopped.

According to an embodiment of the present disclosure, based upon the equation (5), the $F(A_A)$ comprises of $N_x N_y$ summations and the gradients may be computed separately for each of the enhancement factor, since the dictionary is different for each of the enhancement factor. However, due to sparse nature of the frequency spectrum of images, only the optimum frequency spectrum images, that is, the ones having significant energy may be considered. The optimum frequency spectrum images may be selected by putting a threshold on the spectrum of LR images, $G_k(f)$. Therefore, based upon equation (8) obtained above and selecting only the optimum frequency spectrums, faster convergence and savings in computation may be achieved.

According to an embodiment of the present disclosure, for reconstructing the one or more SR images, the following conditions must be satisfied:

$L_x$ and $L_y$ must be co-prime, that is, $GCD(L_x, L_y)=1$, and $\alpha_s < K$ In an embodiment (as discussed above), the one or more super-resolution images may be reconstructed by performing, firstly, an initialization step, where, G(f) may be formed by taking the 2-D Fast Fourier Transformation of the LR images. Further, using the NCPS technique, an initial approximate estimate of the translational shifts $\{c_k^0\}_{k=1}^{K}$ may be obtained. Secondly, by the alternating minimization technique, the joint estimate of the unknowns $\hat{A}_A(f)$ and $\hat{s}(f)$ may be obtained. Based upon the $\hat{s}(f)$ and the sub-pixel offsets $\{\hat{c}_{\theta k}/L_\theta\}_{k=1}^{K}$ from the registration step, the desired SR image may finally be obtained. As discussed above, $\alpha_s$ denotes the dimension of the signal subspace, which may also be interpreted as the number of the optimum frequency spectrums (or the significant energy aliased sub-bands). In an embodiment, the second condition $\alpha_s < K$ implies that for the given K LR images, the reconstruction of the one or more SR images may be performed only when the number of aliased sub-bands (that is each row of s(f)) having the optimum frequency spectrums (that is, the significant energy) does not exceed K.

According to an embodiment of the present disclosure, the enhancement factors $L_x$ and $L_y$ may have a direct influence on $\alpha_s$. In an embodiment, the higher the enhancement factors $L_x$ and $L_y$, the higher is the $\alpha_s$ due to more aliasing bands. Further, as discussed above, since $0 < c_{\theta k} < L_\theta$, and equation (2) is applicable only when $\{c_k^0\}_{k=1}^{K}$ are integers, that is, at the end of the registration step, if there is proper convergence, the sub-pixel shift $\{round(c_{\theta k})/L_\theta\}_{k=1}^{K}$. Based upon $c_{\theta k}=round(c_{\theta k})+\Delta c_{\theta k}$, the subpixel offset error may be obtained as $\Delta c_{\theta k}/L_\theta$.

In an embodiment, by optimizing the enhancement factor $L_\theta$ by some factor, for example, $\beta$ to $\beta L_\theta$, one or more appropriate scaled subpixel shift, that is, $\{round(\beta c_{\theta k}/\beta L_\theta)\}_{k=1}^{K}$ may be obtained. It may be observed that $|round(\beta c_{\theta k})/\beta L_\theta) - (round(c_{\theta k})/L_\theta| \leq |\Delta c_{\theta k}/L_\theta|$. Thus, the enhancement factors $L_x$ and $L_y$ may be selected appropriately to satisfy the conditions $GCD(L_x, L_y)=1$, and $\alpha_s < K$. Further, the enhancement factors $L_x$ and $L_y$ must be optimum for an accurate estimate of the subpixel offsets for the given K LR images. In an embodiment, for selecting optimum enhancement factors $L_x$ and $L_y$, the $L_x$ and $L_y$ may be selected as variables in the alternating minimization technique. However, this may increase computational complexity.

Figure 4:
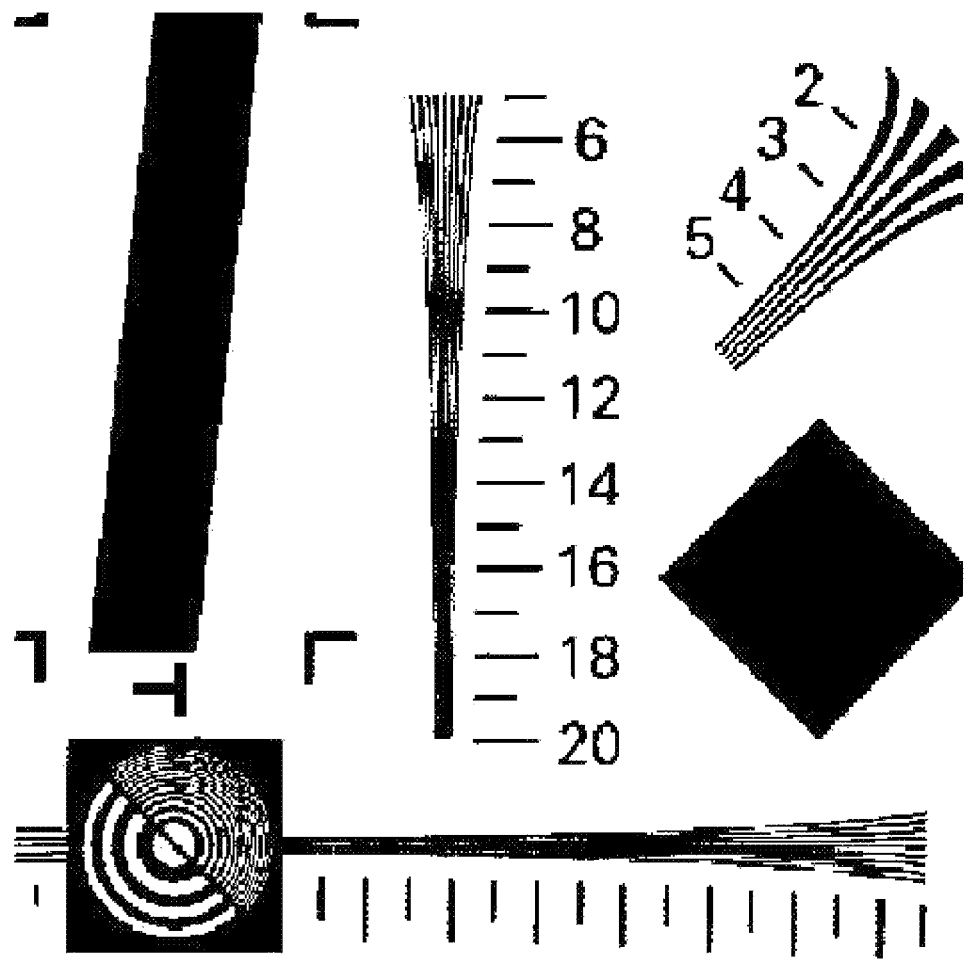
FIG. 4 illustrates visual representation of a super-resolution image reconstructed by estimating translational values according to an embodiment of the present disclosure.

According to an embodiment of the present disclosure, the optimal enhancement factors $L_x$ and $L_y$ may be selected, firstly, by using approximation method such as the NCPS for obtaining the subpixel offsets, that is, ratio $\{c_{\theta k}^{(O)}/L_\theta\}_{k=1}^{K}$ for $L_\theta$. Further, for optimum $L_x$ and $L_y$, the corresponding $\{round(c_k^0)\}_{k=1}^{K}$ may be obtained and the covariance matrix using equation (7) may be formed. In an embodiment, based upon eigenvalues for each of the $L_x$ and $L_y$, factors $L_x^P$ and $L_y^P$ may be selected which may satisfy the conditions $GCD(L_x, L_y)=1$, and $\alpha_s < K$ and is optimum. The registration technique (as discussed above) may then be continued using the factors $L_x^P$ and $L_y^P$ and subsequently at the restoration stage, the one or more SR images may then be reconstructed by performing, firstly, an initialization step, where, G(f) may be formed by taking the 2-D Fast Fourier Transformation of the LR images. Further, using the NCPS technique, an initial approximate estimate of the translational shifts $\{c_k^0\}_{k=1}^{K}$ may be obtained. Secondly, by the alternating minimization technique, the joint estimate of the unknowns $\hat{A}_A(f)$ and $\hat{s}(f)$ may be obtained. Based upon the $\hat{s}(f)$ and the sub-pixel offsets $\{\hat{c}_{\theta k}/L_\theta\}_{k=1}^{K}$ from the registration step, the one or more SR images may finally be reconstructed. Referring to FIG. 4, the SR image of 320×320 reconstructed using the above methodology may be referred.

According to an embodiment of the present disclosure, the simulation results obtained by implementing the proposed methodology for reconstructing the one or more SR images may now be considered in detail. In an embodiment, simulations were performed by fixing the number of LR images to K=16. The LR images were generated based upon sampling of h(t) image, where the h(t) image was subjected to translation motion with different shifts and without using any anti-aliasing filter. An initial offset estimation was obtained based upon the NCPS technique, and the registration and restoration was performed using the alternating minimization and the non-uniform bi-cubic interpolation techniques respectively. Referring to FIGS. 3 and 4, the LR image of size 64×64 and the SR image of size 320×320 (the enhancement factor of 5×5) respectively may be referred. Both the LR and the SR images were obtained using the proposed methodology. Referring to FIG. 4 again, a higher quality SR image reconstructed using the proposed methodology may be referred.

According to an embodiment of the present disclosure, in the next simulation, the enhancement factors $L_x$ and $L_y$ were varied to observe the effect of the variation on registration accuracy. Referring to table 3 below, the results obtained based upon the variation may be referred comprising of the results obtained using the NCPS technique. Referring to table 3 again, it may be observed that as the variation is performed and the enhancement factors $L_x$ and $L_y$ increase, the registration accuracy is enhanced. In contract to the traditional systems and methods which use a very high size matrices, the proposed disclosure requires the matrix of size $16 \times L_x L_y$. Furthermore, the convergence may be achieved by using less than 20 alternating minimization alterations by using the proposed methodology.

TABLE 3

| NCPS | $L_X = 5, L_y = 6$ | $L_X = 10, L_y = 11$ | $L_X = 15, L_y = 16$ |
|---|---|---|---|
| 0.563 | 0.0620 | 0.0086 | 0.0024 |

According to an embodiment, the advantages of the proposed disclosure may now be considered in detail. The present disclosure provides for a computationally efficient approach for obtaining super-resolution image/s from a set of LR images, when the entire spectrum is affected by aliasing. The multi-coset sampling technique may initially be used to establish the relationship between the LR image spectrums and the SR image spectrum. The proposed disclosure facilitates band-wise aliasing in contrast to bin-wise aliasing of the existing approaches, thereby providing a huge reduction in the size of the relationship matrix on the order of number of LR images and number of sub-bands, and further making it independent of the dimensions of the LR and SR images. Alternating minimization framework is to jointly estimate subpixel offsets and the sparse sub-bands of the SR image spectrum using the steepest-descent technique and the MUSIC technique, respectively. Further, the proposed methodology provides for improving the sub-pixel offset estimation accuracy. These are verified through simulation results discussed above. The proposed approach can easily and efficiently be deployed on mobile platforms which have limited resources and still can obtain an SR image in almost real-time. Further, the proposed disclosure provides for smaller matrix sizes to be handled during the computation, typically on the order of number of images and enhancement factors, and is completely independent on the actual dimensions of the LR and the SR image/s, hence requiring significantly lesser resources than the traditional systems and methods. Referring to tables 1, 2 and 3, brief simulation results are also provided to demonstrate the efficacy of this approach.

In an embodiment, the memory 102 can be configured to store any data that is associated with the reconstruction of super-resolution images based upon a set of translation values. In an embodiment, the information pertaining to the one or more LR images, the set of translational values and the one or more SR images reconstructed are stored in the memory 102. Further, all information (inputs, outputs and so on) pertaining to the reconstruction of super-resolution images based upon a set of translation values may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A method for reconstructing super-resolution images under total aliasing based upon a set of translation values, the method comprising a processor implemented steps of:
   capturing, using an image capturing device, a set of low-resolution images comprising of one or more aliased images;
   estimating, using a Fast Fourier transformation, the set of translation values from the set of low-resolution images for obtaining one or more optimized frequency spectrums to reconstruct one or more super-resolution images, wherein the set of translation values comprise translational shifts of the set of low-resolution images, and wherein estimating the set of translation values further comprises:
   (i) determining, using a normalized cross power spectrum technique, a set of initial translational values based upon one or more low-resolution images and enhancement factors for updating a second set of translational values; and
   (ii) updating the second set of translational values based upon the set of initial translational values and one or more gradient values to extract the one or more super-resolution images;
   obtaining, using a multiple signal classification (MUSIC) technique, the one or more optimized frequency spectrums from the set of translation values for extracting the one or more super-resolution images; and reconstructing, using an Inverse Fourier transformation, the one or more super-resolution images from the one or more optimized frequency spectrums.

2. The method of claim 1, wherein the step of updating the second set of translational values comprises identifying the one or more gradient values for updating one or more integer values closest to the set of translational values to extract the one or more super-resolution images.

3. A system comprising:

a memory storing instructions;

one or more communication interfaces; and one or more hardware processors coupled to the memory via the one or more communication interfaces, wherein the one or more hardware processors are configured by the instructions to:

capture, using an image capturing device, a set of low-resolution images comprising of one or more aliased images;

estimate, using a Fast Fourier transformation, a set of translation values from the set of low-resolution images for obtaining one or more optimized frequency spectrums to reconstruct one or more super-resolution images, wherein the set of translation values comprise translational shifts of the set of low-resolution images, and wherein estimating the set of translation values further comprises:

(i) determine, using a normalized cross power spectrum technique, a set of initial translational values based upon one or more low-resolution images and enhancement factors for updating a second set of translational values; and (ii) update the second set of translational values based upon the set of initial translational values and one or more gradient values to extract the one or more super-resolution images;

obtain, using a multiple signal classification (MUSIC) technique, the one or more optimized frequency spectrums from the set of translation values for extracting the one or more super-resolution images; and reconstruct, using an Inverse Fourier transformation, the one or more super-resolution images from the one or more optimized frequency spectrums.

4. The system of claim 3, wherein the one or more hardware processors are further configured to update the second set of translational values by identifying the one or more gradient values for updating one or more integer values closest to the set of translational values to extract the one or more super-resolution images.

5. One or more non-transitory machine readable information storage mediums comprising one or more instructions which when executed by one or more hardware processors causes the one or more hardware processor to perform a method for reconstructing super-resolution images under total aliasing based upon a set of translation values, said method comprising:

capturing, using an image capturing device, a set of low-resolution images comprising of one or more aliased images;

estimating, using a Fast Fourier transformation, the set of translation values from the set of low-resolution images for obtaining one or more optimized frequency spectrums to reconstruct one or more super-resolution images, wherein the set of translation values comprise translational shifts of the set of low-resolution images, and wherein estimating the set of translation values further comprises:

(i) determining, using a normalized cross power spectrum technique, a set of initial translational values based upon one or more low-resolution images and enhancement factors for updating a second set of translational values; and (ii) updating the second set of translational values based upon the set of initial translational values and one or more gradient values to extract the one or more super-resolution images;

obtaining, using a multiple signal classification (MUSIC) technique, the one or more optimized frequency spectrums from the set of translation values for extracting the one or more super-resolution images; and reconstructing, using an Inverse Fourier transformation, the one or more super-resolution images from the one or more optimized frequency spectrums.

6. The one or more non-transitory machine readable information storage mediums of claim 5, wherein the step of updating the second set of translational values comprises identifying the one or more gradient values for updating one or more integer values closest to the set of translational values to extract the one or more super-resolution images.

* * * * *